June 24, 1952        J. L. WILBURN        2,601,351
JOINING SLEEVE
Filed June 11, 1948        2 SHEETS—SHEET 1
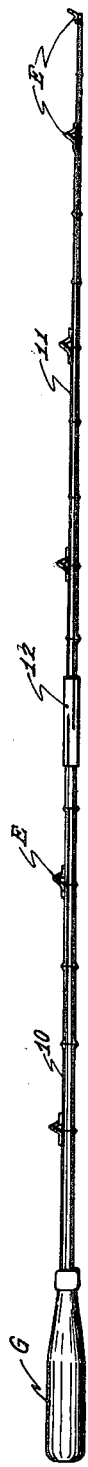
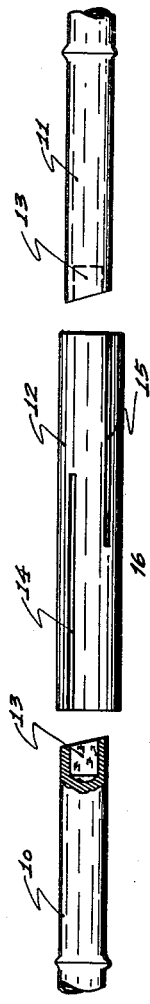
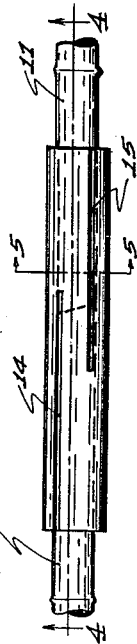
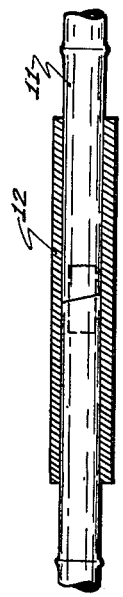
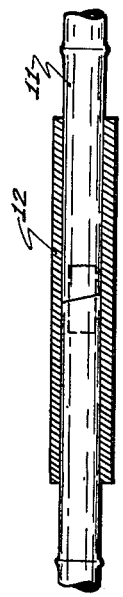
Inventor
JOHN L. WILBURN
By
A. F. Flournoy
Attorney June 24, 1952   J. L. WILBURN   2,601,351
JOINING SLEEVE Filed June 11, 1948   2 SHEETS—SHEET 2

Inventor
JOHN L. WILBURN
By
A. F. Flournoy
Attorney

Patented June 24, 1952

2,601,351

UNITED STATES PATENT OFFICE 2,601,351

JOINING SLEEVE

John L. Wilburn, Texarkana, Tex.

Application June 11, 1948, Serial No. 32,378

1 Claim. (Cl. 287—108)

My invention relates to sleeve members for joining sections of rod or tubing but more especially for joining fishing rod sections together.

The joining sleeve that I have invented will take the place of the ferrule members (male and female members) employed in the prior art teaching for joining sections of fishing rods together.

The objection to the prior art type of joining means is that they must be made to fit together in such a precise manner that whenever any dirt, corrosion or other foreign matter accumulates on the joining surfaces of the members of the pair it becomes impossible to join the two together or if joined together they stick so tight that they can not be separated without a great deal of effort.

An object of my invention is to provide a single sleeve member which will not be permanently attached to any end portion of a fishing rod section but may be used to join the ends of fishing rods.

Another object of my invention is to provide a joining sleeve for use in joining sections of fishing rods together or other rods and one that will expand to accommodate the ends of the rods joined together by it in a manner to firmly hold the ends of the fishing rod or other rods together but hold them in a manner that they may be easily disconnected from one another.

Another object of my invention is to provide a fishing pole joining sleeve with viewing slots to facilitate accurate alignment of the ends of fishing pole sections joined by the same in order that the pole sections may be aligned in straight fashion and bring into alignment the eyelets on the sections of the fishing pole.

Other objects and advantages of my invention will appear in the course of my detailed description of my accompanying drawings illustrating forms of expandable sleeves which embody my invention.

In the drawings, Fig. 1 is an assembly view of a fishing pole shown joined together by an expandable sleeve which embodies my invention.

Fig. 2 is an enlarged elevational view of the sleeve with the ends of the sections of the fishing pole shown removed from the sleeve.

Fig. 3 is an elevational enlarged view of the sleeve with the sections of the fishing pole joined together by the same.

Fig. 4 is a cross sectional view of Fig. 3 taken on line 4—4.

Fig. 5 is a cross sectional view of Fig. 3 taken on line 5—5.

Figure 7:
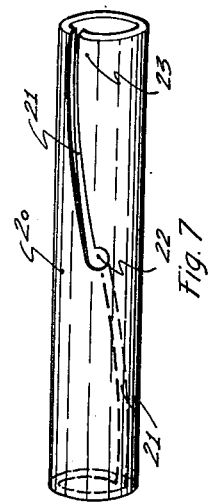
Fig. 7 is an elevational view of a modified form of joining sleeve embodying my invention.

In the drawings Fig. 1 illustrates a conventional form of fishing rod which is made up of a handle section 10 and a tip section 11, both of which sections are provided with conventional eyelets E through which a fishing line, not shown, may be strung.

The handle section 10 is provided with a grip G which includes a conventional fitting for receiving a reel, not shown, on which the line may be wound. Both the handle section 10 of the fishing rod and the tip section 11 have their joining ends reinforced by cork plugs 13.

Note also that these joining ends of the handle section 10 and tip section 11 are cut slant-wise. They are cut this way so that they can be accurately matched within the ferrule to facilitate their correct alignment to the end that the completely assembled fishing pole is exactly straight. This feature is very important in the manufacture of bamboo cane fishing poles.

An additional reason for matching the ends of handle section 10 and tip section 11 is to correctly align the eyelets E on the handle section 10 in alignment with eyelets E on the tip section 11.

The sleeve 12 is provided with a bore which is adapted to receive the prepared joining ends of section 10 and section 11 of the fishing pole in a manner to snugly fit the same when the sleeve 12 is slightly expanded. The sleeve 12 is provided with opening slots 14 and 15 which serve as viewing slots through which the joined ends of the handle section 10 and tip section 11 may be viewed. The slots 14 and 15 open in receiving the joining ends of the handle section 10 and tip section 11.

The end portions between joints of sections of a bamboo fishing rod are naturally tapered. This offers no disadvantage in the use of my invention in a joining sleeve for the reason that the slots 14 and 15 enable the sleeve to be expanded at its ends in a cone shaped fashion to accommodate the tapered joining ends of sections of a bamboo pole.

Figure 6:
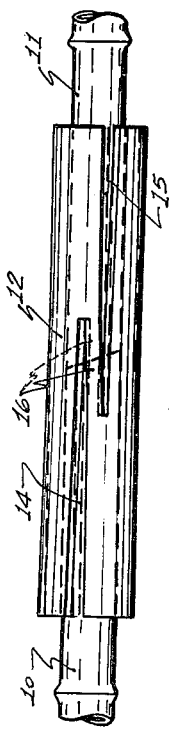
Fig. 6 is a diagrammatical view of my joining sleeve with sections of a fishing pole pushed into the same.

The diagrammatic view of Fig. 6 shows this feature even more clearly and shows also that the circumference of the sleeve 12 even at its central medial portion may be expanded.

If the joining ends of the handle section 10 and tip section 11 happen to be slightly oversized, they can still be forced together in the proper joining position in contact with one another because the circumferential joining section 16 will move under sufficient pressure from its normal horizontal position, shown by the dotted lines in Fig. 6, to a spiral position, shown by the solid lines of Fig. 6. Thus it may be said that either or both ends of my joining sleeve 12 are adapted to expand to receive end portions of the fishing pole and that it is also adapted to expand in its medial portion circumferentially to permit the ends of the sections of the fishing pole to be brought into contact with one another.

Due to the fact that my joining sleeve 12 will expand in the manner described above, a single size of the joining sleeve is useful in joining ends of pole sections within a small range of sizes. It also takes care of small irregularities on the joining ends of the pole sections.

Figure 4 shows precisely how the handle section 10 and tip section 11 of the fishing pole should be brought together in matching fashion.

If the joining ends are not in perfect aligning contact with one another a crack between the joining ends will show up, at least through one of the slots 14 or 15. The person joining the ends of the pole, upon seeing the crack, revolves one of the pole sections with respect to the other while forcing the two together until the crack disappears into a line which line will be seen through both the slots 14 and 15.

Due to the fact that the joining ends are matched on a plane at an angle less than 90° with respect to the longitudinal axis of the assembled fishing pole, there can be but one proper joining plane in which the joining ends of section 10 and section 11 can contact one another.

My joining sleeve 12 should preferably be made out of some type of non-corrosive metal or plastic material. I have found that a section of aluminum tubing of an outside diameter of three-fourths (¾) of an inch having a wall thickness of approximately one-sixty fourth (1/64) of an inch, and of a length of approximately four and one-half (4½) inches is an admirable piece of stock out of which to fashion the sleeve 12 for joining sections of a bamboo fishing pole.

I have found that in a joining sleeve made out of the size piece of stock described above the slots 14 and 15 performed their proper function when overlapped about a half an inch with one another. The medial joining section 16 was approximately one-fourth (¼) of an inch wide. The degree of overlap of the slots 14 and 15 and the width of the circumferential medial section 16 may be varied to meet manufacturing conditions. It is obvious that the thicker the wall of the tube stock is the narrower the medial joining section 16 should be because when the sleeve 12 expands at its center this medial section 16 must be bent out of its normally longitudinal position into the angular position, shown in Fig. 6 of the drawing. The cross sectional area of the section 16 is one of the determining factors governing the magnitude of the moment of inertia of the section which moment of inertia is the true measure of the section's resistance to bending.

The slots 14 and 15 should be made wide enough to permit the end of the joining sleeve 12 to be restricted so that the joining sleeve might also be used to join together sections of a rod, the joined ends of which are slightly undersized.

In the modified form of the sleeve illustrated by Fig. 7 of the drawing, the sleeve is designated generally by numeral 20. The spiral slots 21 originate from holes 22 bored through opposite sides of the sleeve 20. This spiral formation of the slots produces the tab formations 23 which are very useful, especially where the ends of sections of poles to be joined together happen to be undersize. For example, to insure a tight fit on the ends of the joined sections of a fishing pole, the tabs are bent inwardly to the dotted line position shown in Fig. 7. Even if the outside diameter of the ends of the pole sections inserted in the sleeve 20 is slightly less than the inside diameter of the sleeve 20, the inwardly bent tab 23 will grip the pole sufficiently to insure a snug fit in the sleeve 20.

Figure 9:
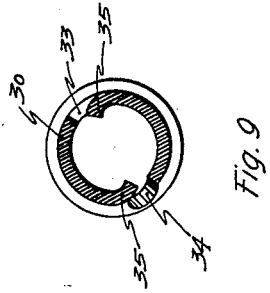
Fig. 8 is a plan view of another modified form of joining sleeve embodying my invention and Fig. 9 is a cross sectional view of the joining sleeve illustrated by Fig. 8 taken on line 9—9 of the same.
Figure 8:
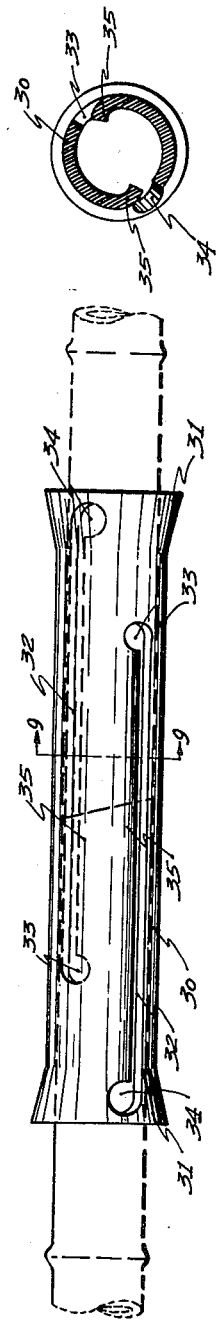

In the modified form of joining sleeve illustrated by Fig. 8 and Fig. 9 of the drawing, numeral 30 designates the sleeve generally.

This form of the joining sleeve 30 terminates at its ends in flared portions 31. The slots 32 originate in medial positioned origin bores 33 which are positioned offset relative to the longitudinal center line of the slots. The slots 32 are cut in overlapping positions as to length through opposite sides of the sleeve 30.

The slots 32 terminate in flared portions 31 in terminating bores 34, each of which is formed offset to the center line of the slot 32 and on the same side as the companion origin bore 33. The position of the slots 32 and the pairs of bores, the origin bores 33 and the terminating bore 34, form projections in the side wall of the sleeve which are called tabs 35.

The tabs 35 are adapted to be bent inwardly of the sleeve 30 in the manner indicated by the dotted lines shown in Fig. 9 of the drawings. When the tabs 35 are bent inwardly to reduce, in a yielding manner, the inside diameter of the sleeve 30 they make the same grip the joining ends of the underside sections of a pole 10.

It is further pointed out that in the case of full size pole sections the inwardly bent tabs 35 exert extra pressure on the joined ends of the sections of a pole 10. This is true because tabs 35 must be sprung back into line with the main wall surface of the sleeve 30 before the slots 32 are spread to accommodate the joined ends of sections of pole 10.

Since the sleeve 30 will exert pressure on the joining ends of pole 10, merely by the yielding of the sleeve accommodated by the spreading of the slots, the tabs 35 do not have to be bent inwardly when the sleeve is used in joining pole sections properly sized to fit into the sleeve.

The flared portions 31 serve as guides for introducing the joining ends of sections of pole 10 into the main body portion of the sleeve 30.

While I have illustrated my invention in a joining sleeve joining together a single pair of cane pole sections, several of the sleeves might be used in joining more than two sections of a cane pole together or be used for any other purpose where the joining together of rod sections or tube sections is desired.

Having thus described my invention, I claim:

A sleeve for joining the ends of rods comprising a tubular member having a pair of slots therein, said slots commencing in a medial position of said tubular member and extending from their points of origin through opposite ends of said tubular member in spiral curves and rod members fitting in the opposite ends of said sleeve, the outer ends of said spiral curve slots terminating in inwardly bent tabs tending to grip the ends of said rod members.

JOHN L. WILBURN.

REFERENCES CITED

The following references are of record in the file of this patent:

UNITED STATES PATENTS

| Number | Name | Date |
| --- | --- | --- |
| 154,876 | Light | Sept. 8, 1874 |
| 362,697 | Albee et al. | May 10, 1887 |
| 1,467,821 | Tuttle | Sept. 11, 1923 |
| 1,769,967 | Saurman et al. | July 8, 1930 |
| 2,366,653 | Risk | Jan. 2, 1945 |
| 2,456,764 | Bach et al. | Dec. 21, 1948 |

FOREIGN PATENTS

| Number | Country | Date |
| --- | --- | --- |
| 371,727 | Italy | Mar. 9, 1939 |